United States Patent

Piccardo

[15] 3,666,237
[45] May 30, 1972

[54] WELDED FABRICATED BALL VALVE

[72] Inventor: Jack E. Piccardo, Oakland, Calif.
[73] Assignee: Grove Valve and Regulator Company, Oakland, Calif.
[22] Filed: May 21, 1970
[21] Appl. No.: 39,459

[52] U.S. Cl. .................................................251/367
[51] Int. Cl. .................................................F16k 27/00
[58] Field of Search................251/315, 317, 309, 366, 148, 251/151, 152, 367; 29/157.1

[56] References Cited

UNITED STATES PATENTS

| | | | |
|---|---|---|---|
| 2,890,017 | 6/1959 | Shafer | 251/174 |
| 3,235,226 | 2/1966 | Allen | 251/315 X |
| 3,315,697 | 4/1967 | Oliver | 251/315 X |
| 3,411,746 | 11/1968 | Scaramucci | 251/315 |
| 3,339,887 | 9/1967 | Hutchens | 251/315 X |
| 3,155,368 | 11/1964 | Shafer | 251/315 X |
| 3,068,887 | 12/1962 | Grove | 251/315 X |
| 3,497,178 | 2/1970 | Priese | 251/315 X |
| 3,277,919 | 10/1966 | Piccardo | 251/315 X |

FOREIGN PATENTS OR APPLICATIONS

| | | | |
|---|---|---|---|
| 230,694 | 4/1963 | Austria | 251/315 |
| 1,207,741 | 12/1965 | Germany | 251/315 |

*Primary Examiner*—Samuel Scott
*Attorney*—Melvin R. Stidham

[57] ABSTRACT

A valve body construction comprising a tubular body member with a closure received in one end thereof against an internal abutment. A lock ring engages against the outer face of the end closure around its outer edges and is welded to one end of the body member to hold the closure in place, contraction of the weld during cooling serves to clamp the closure tightly in place. In a preferred embodiment, the other end of the tubular body is swaged inward to a small diameter opening whereby a hub may be welded directly to the edge of the opening, eliminating the need for a second end closure.

6 Claims, 1 Drawing Figure

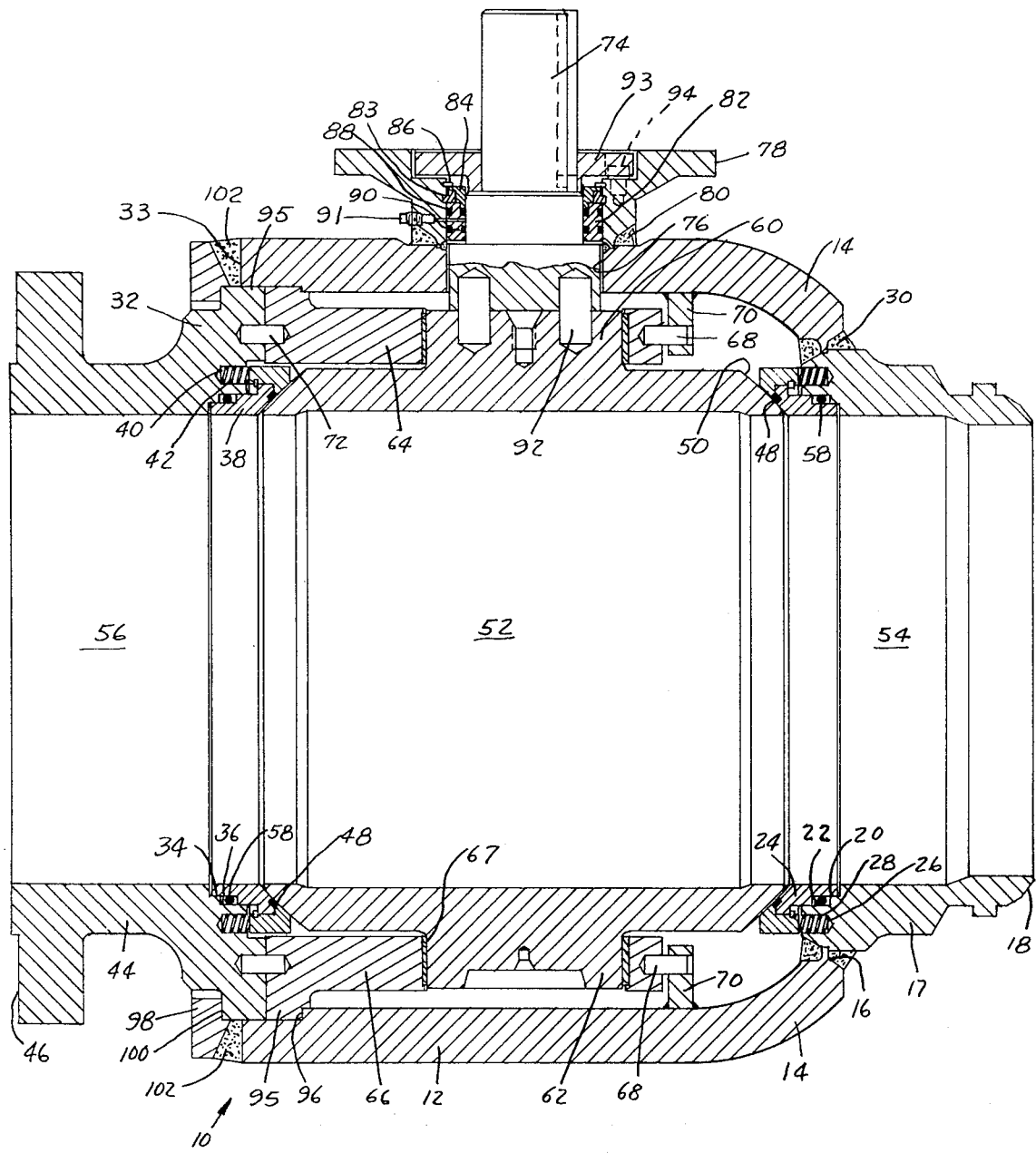

WELDED FABRICATED BALL VALVE

BACKGROUND OF THE INVENTION

This invention relates to a welded fabricated valve body construction and, more particularly, to a valve body of welded construction that may be disassembled for entry without destruction of the valve body.

In some valve structures, such as gate or ball valves, it has been deemed advantageous not to cast the body, but to fabricate it of tubular members and rolled shapes, with at least one removable closure providing convenient access for repair or replacement of internal components. In the case of certain welded body valves, it is necessary to sever or destroy the body in order to gain internal access. In the case of end closures that are held in place by bolts threaded into an end face of the body or housing, the body walls have to be excessively thick in most areas in order to compensate for material removed in the area of the tapped holes. In addition, the radially outward location of the bolts beyond the inner surface of the body leaves a substantial bending moment arm across the surface of the body under internal pressures.

OBJECTS OF THE INVENTION

It is an object of this invention to provide a fabricated valve body construction with an end closure that fits within a tubular body member to minimize the bending moment arm across it.

It is a further object of this invention to provide a fluid tight valve body suitable for off-shore installation without bolt corrosion and failure.

It is a further object of this invention to provide a fabricated valve body without requirement of bolts.

It is a further object of this invention to provide a valve body with a removable closure without bolting.

It is a further object of this invention to provide a valve body construction with minimum wall thicknesses.

Other objects and advantages of the invention will become apparent from the detailed description to follow when read in conjunction with the accompanying drawing.

BRIEF SUMMARY OF THE INVENTION

In the preferred embodiment of this invention, the main body member is of cylindrical tubular configuration over most of its length, although swaged inward at one end to form an integral end closure. A hub with means for connecting it to a pipe line is welded directly to the swaged end. A valve ball with bearing blocks carried on its trunnions is inserted through the open end of the valve body until flanges on the trailing ends of the bearing blocks contact an internal shoulder in the valve body. Then, an end closure with seat rings mounted thereon is inserted into the open end to clamp the bearing block flanges against the internal shoulder. Finally, a lock ring of a cross section sufficient to take internal loads against the end closure is placed against the outer face of the end closure around the edge thereof, and securely welded to the body top. As the weld cools, it contracts and draws the ring more firmly against the end closure to clamp the bearing block flanges more tightly. When it is desired to repair or replace internal components, the weld securing the lock ring to the body is simply cut away and, after repairs, a replacement lock ring is welded to the body.

BRIEF DESCRIPTION OF THE DRAWING

The drawing is a vertical section of the ball valve embodying features of this invention.

DESCRIPTION OF A PREFERRED EMBODIMENT

Referring now to the drawing with greater specificity, there is shown a ball valve 10 including a generally cylindrical main body tube 12 which is swaged inward at 14 to form an integral end closure with a reduced diameter end opening 16. A hub 17 may be formed from a piece of pipe and is provided at one end with a standard pipeline joint as, for example, the weld end 18 shown. Its other end is bored at 20 and 22 to accomodate a seat ring 24 and holes 26 are drilled around its circumference to accomodate a plurality of coil springs 28. After the hub is so bored and drilled, it is placed in the swaged-in end opening 16 and welded securely in place at 30.

A removable end closure 32 for the opposite circular end 33 of the body tube 12 is bored at 34 and 36 to accomodate a seat ring 38 and a plurality of holes 40 are drilled around its circumference to accomodate biasing springs 42. The end closure 32 may be formed with an integral hub 44 and a pipeline connection joint such as the standard flange 46 shown.

The seat rings 24 and 38 are preferably provided with resilient main seals such as O-rings 48 to seal against the valve ball 50. The ball 50 has a flow passage 52 therethrough, which in open position, is aligned with flow passages 54 and 56 in the end closure hubs 17 and 44. Additional O-rings 58 are provided to seal around the seat rings 24 and 38.

The valve ball 50 has oppositely disposed top and bottom trunnions 60 and 62 received in upper and lower bearing blocks 64 and 66, each carrying a suitable bearing 67. A pin 68 in one end of each bearing block 64 and 66 is received in locating blocks 70 welded in the body tube 12, and on the other end of each bearing block, a pin 72 engages in the end closure 32. The pins 68 and 72 locate the bearing blocks 64 and 66 in fixed parallel relationship with the axis of the trunnions 60 and 62 located on the desired rotational axis of the valve ball 50. After the ball and the bearing blocks are in place, a stem 74 is inserted through an opening 76 in a top mounting block 78 which is welded at 80 to the body. A seal ring 82, which is held in place by a split ring 83, a retainer ring 84 and a snap ring 86, carries O-rings 88 and 90 to seal around the stem. Hence, simply by removing the snap ring 86 and retainer ring 84, the split ring 83 may be removed for removal of the O-rings 88 and 90, and even the stem 74. A fitting 91 may be provided to test for leakage past the lower stem seal O-ring 90. Pins 92 connect the stem 74 to the upper trunnion 60 in order to transmit rotation thereto. A stop plate 93, keyed to the stem 74 engages cap screw stops 94 to indicate the open and closed positions of the valve.

The bearing blocks 64 and 66 have radial flanges 95 which seat against an internal shoulder 96 in the valve body. When the end closure is firmly in place, with the bearing block flanges 95 clamped against the shoulder 96, the lock ring 98 is pressed against the radial face 100 of the end closure. Then, a full-depth weld 102 is placed between the lock ring 98 and the annular end face 33 of the body tube 12, and on the end closure 32 to unite the body band 12 to the lock ring 98, and the end closure 32, forming a unitary structure. As the weld is placed, a cooling fluid may be circulated through the valve body in order to prevent damage to O-rings, bearings and other components susceptible to damage by heat. As the weld cools, it contracts, increasing the clamping pressure against the bearing block flanges 95, thus insuring that the rotational axis of the valve ball 50 is fixed. With completion of the weld, the valve 10 is fluid-tight and there are no bolts holding body closures in place. As such, the valve is particularly suitable for off-shore installation where bolts are subject to corrosive failure.

While this invention has been described in conjunction with a preferred embodiment thereof, it is apparent that modification and changes therein may be made by those skilled in the art without departing from the spirit and scope of this invention.

What is claimed is:

1. A valve structure comprising
   a tubular main body member,
   an end closure having a flow passageway therethrough
   a portion of said end closure being received in one end of said main body member
   means in said body member forming an axially inward abutment for said closure,
   a lock ring engaging the outer face of said end closure around the edge thereof, and a weld around and between said lock ring and said one end of the main body member.

2. The valve structure defined by claim 1 wherein:

said end closure portion extends outside said body member and said lock ring is spaced from said one end so that said weld unites said body member, end closure and lock ring.

3. The valve structure defined by claim 1 including:

a valve member, trunnions on said valve member, a pair of bearing blocks rotatably receiving said trunnions, a radial shoulder in said body member near said one end, and a radial flange on each of said bearing blocks engaging said shoulder, said radial flanges forming said inward abutment for said closure, whereby said bearing blocks are clamped thereby, said valve member with bearing blocks on said trunnions being removable through said one end of the body member when said closure member is removed.

4. The valve structure defined by claim 3 including:

a stem extending through an opening in said main body member and coupled to one of said trunnions, a seal ring around said stem, and a removable retainer in said opening, holding said stem and seal ring in place.

5. The valve structure defined by claim 1 wherein:

the other end of said tubular main body member tapers inward to a reduced diameter opening, and including:

a tubular hub welded to the edge of said opening.

6. The valve structure defined by claim 5 wherein:

said main body member is cylindrical over a portion of its length from said one end.

* * * * *